United States Patent [19]

Daftary

[11] 3,925,569

[45] Dec. 9, 1975

[54] WET PROCESS FOR MAKING BLANDER HIGH-PROTEIN SOYBEAN PRODUCTS

[75] Inventor: Rasik D. Daftary, Decatur, Ill.

[73] Assignee: Archer Daniels Midland Company, Decatur, Ill.

[22] Filed: Apr. 2, 1973

[21] Appl. No.: 345,969

Related U.S. Application Data

[63] Continuation-in-part of Ser. No. 245,920, April 20, 1972, abandoned.

[52] U.S. Cl. ............................... 426/634; 426/430
[51] Int. Cl.² ............................................ A23L 1/20
[58] Field of Search ........... 426/148, 205, 430, 352, 426/364, 372, 353, 431, 212; 260/123.5

[56] References Cited

UNITED STATES PATENTS

| | | | |
|---|---|---|---|
| 2,445,931 | 7/1948 | Beckel et al. | 260/412.4 |
| 3,023,107 | 2/1962 | Mustakas et al. | 426/430 |
| 3,170,802 | 2/1965 | Fukushima | 426/46 |
| 3,520,868 | 7/1970 | Henderson et al. | 426/430 X |
| 3,594,186 | 7/1971 | Hawley et al. | 426/148 |
| 3,598,610 | 8/1971 | Hawley et al. | 426/372 |
| 3,721,569 | 3/1973 | Steinkraus | 426/486 X |
| 3,809,771 | 5/1974 | Mustakas | 426/364 |

OTHER PUBLICATIONS

Altschul, Aaron, *Processed Plant Protein Foodstuffs*, 1958, Academic Press, N.Y., pp. 135–136.

*Primary Examiner*—A. Louis Monacell
*Assistant Examiner*—Esther L. Massung
*Attorney, Agent, or Firm*—Plumley & Tyner

[57] ABSTRACT

Soybeans are soaked in alcohol-water mixtures (a) to arrest the formation of undesirable off-flavors, (b) to minimize the losses of proteins, and (c) when compared to similar products available today, to provide soybeans and their derivative products which are more bland, which are higher in protein content, which are lower in flatulence, and which have improved functional properties.

11 Claims, No Drawings

WET PROCESS FOR MAKING BLANDER HIGH-PROTEIN SOYBEAN PRODUCTS

This is a continuation-in-part of my copending application Ser. No. 245,920 filed Apr. 20, 1972, now abandoned.

A large portion of the World's population today is undernourished due to inadequate diet. Protein is one of the principal deficiencies in the diet of these persons. For example, the amount of meat available, particularly in the very heavily populated countries of the World, is at best limited. Furthermore, the cost of meat when available is beyond the reach of many persons. Thus, a need exists for a low cost, readily available, protein, dietary food product.

Various food products made from oil seeds, particularly soybeans, provide material of high protein content and high nutritive value. The interest in oil seed products as supplements or replacements for other dietary proteins has noticeably increased in recent years. Typical oil seeds include soybeans, sesame, cotton seed, peanut, rape seed, sunflower seed, and cereal grains such as corn and wheat. Typical examples of products prepared from oil seed are flour, meal, and foods, such as bread, made from flour or meal. Oil seed food products are highly desirable in dietary protein supplements for many reasons, e.g. they are relatively inexpensive and thus can be made available to persons of low income, and they can be provided in a dry form and therefore can be stored for extended periods without refrigeration. In the past some of these food products such as soy food products have been limited in use because of their characteristic soy taste, sometimes described as a beany taste, which many people find objectionable. In the past much research effort has been expended in trying to find a method for reducing or eliminating the characteristic soy taste from soybean food products. For example, it has been suggested that soybeans be sprouted or subjected to infrared radiation to reduce the soy taste. Although many of the proposed methods have been effective to a degree, they have not solved the problem, and, furthermore, the methods have been complex and expensive.

This invention relates to a wet process which comprises soaking full fat soybeans or soybean products in alcohol-water mixtures to produce blander, high-protein, low-flatulence products which may be either full-fat or defatted and which exhibit improved functional properties.

It is now becoming an accepted fact that whole soybeans do not innately possess undesirable soy flavors (such as that present in hexane-defatted soy meal) but that such flavors are formed almost instantaneously when pressed or cracked beans come in contact with water. The mechanism responsible for the formation of these off-flavors is believed to involve enzyme systems, which include lipoxidases and peroxidases. Many means have been suggested for arresting this mechanism: (1) using hot water or heat during grinding of the beans, (2) boiling or roasting the beans, or (3) using acids, bases, salts or buffers in treating the beans.

However, when high temperatures and/or chemicals are used, not only are the functional properties of the soy proteins degraded, but also the products are not always sufficiently bland. Furthermore, the use of such high temperatures and/or chemicals does not directly produce a blander, full-fat, high-protein flaked product which can be used without further treatment or be defatted to any desired degree. These methods are also disadvantageous because they are complex and expensive.

According to the present invention, the disadvantages of the prior art are overcome by soaking full fat soybeans or soybean products in alcohol-water mixtures, preferably ethanol-water or isopropanol-water mixtures without the necessity of using heat, pressure or other chemicals. It has been discovered that by using the process of this invention the entire mechanism of producing undesirable soy flavors is prevented or arrested before these off-flavors are formed. The scientific principles underlying this invention are not fully understood, but it is believed that by soaking whole soybeans in alcohol-water mixtures direct contact between water and cracked or-pressed beans is eliminated and the instantaneous formation of the typical soy off-flavors is thereby prevented. It is believed that the complete penetration of alcohol-water mixture into the whole beans (during the soaking period) deactivates the enzyme systems responsible for producing the off-flavors, perhaps by way of denaturing the enzyme proteins or otherwise altering the physical/chemical nature of enzyme molecules before they can cause the production of undesirable flavors.

The products of this invention are full-fat materials which have a desirable combination of properties not found when other processes are used. The products remain as full-fat materials, the enzymes have been deactivated and therefore the product is remarkably bland in taste, the color remains desirably light, and the functionality of the protein is high. Toasting or other high temperature means or chemical means of deactivating the enzymes also denature the protein and produce a low functionality in the protein. A convenient means for measuring the protein functionality is to determine the Protein Dispersibility Index (PDI) which is fully described in AOCS Method-Ba-10-65 (American Oil Chemists Society, Champaign, Illinois 1971). Products of this invention which are full-fat whole beans will exhibit a PDI of at least 50%, generally, 50–70%. This is equivalent to somewhat lower PDI values in products which have been further processed by heating, drying, grinding, flaking, etc. These products which have been further processed have PDI values which are 10–20% lower than that of the whole bean; i.e. if the whole bean has a PDI of 60% the product made by defatting the bean or flaking the bean will have a PDI of 40–50%.

The process of this invention has many important advantages other than preventing the development of off-flavors, the process is simple, economical and direct. It maximizes the recovery of proteins from soybeans. It minimizes loss of the inherent functional properties of proteins which might occur by reason of heat and/or chemicals. It directly produces soybeans having all of their native fat, higher protein, higher functionality, lower flatulence, and a pleasant taste. This process permits the production of any of the usual forms, e.g. cotyledons, flakes, grits and powders with the same desirable properties, and it can be used to produce a defatted protein concentrate which is improved in functional properties, color, and flavor over similar products available today.

Although ethanol and isopropanol are the preferred alcohols in this process, other water-miscible lower aliphatic alcohols of 1–4 carbon atoms such as methanol, can also be employed. Food grade denaturants such as acetone, ethyl acetate, or benzene can be present in the alcohol although it is preferred to use undenatured alcohol. Mixtures of two or more alcohols are also operable.

The process of this invention is preferably carried out at ambient temperatures, but higher or lower temperatures, generally from 0°–70°C., can be employed to produce different properties in the final products. Higher temperatures cause a greater denaturation of the protein and lower temperatures cause less denaturation of the protein, and therefore temperatures of about 0°C. to room temperature are employed when it is desired to produce products of high functionality.

Agitation or shaking of the soybean material during soaking in the alcohol-water mixtures is not necessary but is desirable in achieving greater efficiency. It is only necessary that intimate contact between the soybean material and the soak liquid be obtained regardless of the means employed.

The relative proportions of alcohol and water can vary from substantially all alcohol and very little water to the opposite extreme of very little alcohol in a large volume of water. It is desirable in many embodiments to employ a greater proportion of alcohol-to-water in the initial soaking steps and a greater proportion of water-to-alcohol in the subsequent soaking steps. A highly desirable proportion when soybeans are treated is to employ a volume ratio of 2:1 to 1:2 alcohol-to-water in the initial steps and a ratio of 2:1 to all water in the subsequent steps.

In a preferred embodiment the subsequent steps comprise one or more soakings in water containing no alcohol. This embodiment produces products which are lighter in color, more bland, softer in texture, and lower in bulk density than similar products made from processes not including the final water soaking steps.

A particularly desirable effect which can be achieved by a slight modification of such water soaking steps is to incorporate in the final step or steps a flavoring or a seasoning which will be absorbed or adsorbed by the treated soybean material and retained through subsequent drying. For example, a final soaking in salt water produces a salt seasoned substitute for salted peanuts but being considerably more nutritious.

The relative proportions of solids to liquids in this process are not critical. Practical considerations and common engineering procedures will dictate the proportions to be used. Generally proportions from about 1/4 to 1/12 solids/liquid on a weight/weight basis will be satisfactory for all embodiments.

It has been found that, in general, the soybean starting material should be soaked from about 24 to 48 hours, although longer or shorter soaking periods can be employed depending on the temperature of soaking, the condition of the seeds, the physical nature of the material, and the properties and protein content desired in the final products.

This process is capable of treating whole soybeans, dehulled soybeans, split or cracked soybeans, or any other form of full-fat soybean materials.

The normal unmodified pH of the alcohol-water mixture is generally employed, although it can be made slightly acidic or slightly alkaline to produce certain desired properties in the final products.

Generally, other chemicals are not included in the soaking liquid of this process. In certain embodiments, however, chemicals such as sulfurous acid or ascorbic acid can be used to get desired properties in the final products, e.g. better color and better flavor.

At the end of the soaking treatment the soybeans can be used without further treatment, they may be de-hulled and used as cotyledons, they may be flaked, or they may be ground before or after dehulling. The full-fat product, whether it be in the form of flakes, grits, or ground material, can be defatted to any desired degree, to make partially-defatted or fully-defatted products.

This process is operable with any of the usual oilseeds, although soybeans are preferred because of their availability and protein quality. Among other typical oilseeds which can be treated by this process are sesame, cottonseed, peanut, rape seed, sunflower seed, and cereal grains such as wheat and corn.

It is apparent that the process of this invention can be operated in a batch fashion or in a continuous manner by employing well-known techniques.

The following examples illustrate the advantages of the present invention and how it may be practiced.

EXAMPLE 1

This example illustrates the deactivation of enzymes by the process of this invention. A comparison is made among various soy materials which are treated by the process of the present invention to show the activity which remains with respect to the two enzymes lipoxidase and peroxidase. One of the comparative materials is a standard commercial product which is soy meal that has been subjected to a solvent extraction treatment with hexane to remove the remaining portions of soy bean oil and not subjected to a further heat treatment of toasting which is sometimes employed to reduce the activity of such enzymes. A second comparative material is de-hulled soybeans which have merely been subjected to soaking in water. A third comparative material is de-hulled soybeans which have been subjected to the process of the present invention. Since a soaking treatment may remove certain components of the soybeans which are soluble in the soak liquid the results indicate whether the leached out solids are included or not. When such solids are included the way in which it was accomplished was to freeze-dry the entire system of soy material and soak liquid.

In the following tabulation figures are given showing the activity of the two enzymes lipoxidase and peroxidase. The units of lipoxidase activity are calculated from ultraviolet light absorption (amount of conjugated double bonds formed) at 234 nm. The peroxidase activity is expressed in terms of micromoles of oxygen absorbed per minute. Thus in both instances higher values correspond to higher activity of the enzyme. E/W means ethanol-water mixture.

Lipoxidase and the peroxidase activities:

| Product | Units of Lipoxidase Activity | Peroxidase Activity |
|---|---|---|
| 1. Untoasted defatted (hexane) soy meal | 150 | 67 |
| 2. Water-soaked full-fat material (included leached out solids) | — | 244 |
| 3. E/W-soaked full-fat material (included leached out solids) | 1.0 | 0.5 |
| 4. E/W-soaked full-fat material (leached out solids not included) | 0.8 | 0.6 |

The soybeans employed in the last two products of the above tabulation were soaked in ethanol/water (1:1 v/v) mixtures for 48 hours.

EXAMPLE 2

This example indicates the improvement in flavor of products made by the process of this invention.

Three different types of products somewhat similar to the last three products of Example 1 were tested by a taste panel to evaluate blandness of these products. The taste panel comprised of 15 people were asked to compare two samples at one time and to evaluate them on a hedonic scale which gives numerical values of 1 to 9 wherein number 1 is considered the least desirable and number 9 the most desirable. In this instance since bland flavor was the characteristic being tested 9 would be most bland while 1 would be least bland or most flavored. The sample which is tasted is a 2% suspension of the product ground to the particle size of a fine flour and suspended in activated carbon treated tap water.

The products being tested are shown in the following tabulation. Product A is a full-fat soybean material which has been subjected to 48 hours of soaking in ethanol/water mixtures as shown in Example 1 following which the soak liquid has been drained from the soybeans, the beans have then been freeze-dried, and finally the beans are ground to the mesh size of a flour. Product B is the same as product A except that the soak liquid is not drained from the beans and the entire mixture is freeze-dried and ground to the same mesh size. Product C is the same as product A except that the soak liquid is water instead of ethanol/water. In this type of testing procedure differences of more than 1.0 are considered significant and thus if the same product received an evaluation which differed by more than 1.0 in different tests it would be considered that the evaluation was faulty in some regard. As can be seen in the tabulation below products A and B are considerably more desirable than product C.

| Test | Product A | Product B | Product C |
|------|-----------|-----------|-----------|
| 1    | 6.8       | —         | 3.4       |
| 2    | —         | 7.1       | 3.7       |
| 3    | 6.3       | 6.1       | —         |

EXAMPLE 3

This example illustrates one of the advantageous uses which may be made of the defatted soy protein concentrate which can be produced by the process of the present invention. This advantage is that of forming a function of being an emulsifier for animal meat products (such as frankfurters) or for oil and water mixtures which might be used in food preparation.

The preparations made comprised the following constituents on a weight percentage basis:

| Fatless animal meat | 50% |
| Fatty animal meat   | 25% |
| Animal fat          | 25% |

To the above mixture 3.5% by weight of a defatted soy protein concentrate was added. The concentrate (sample A) was prepared by the process of this invention in that soybeans were soaked in an ethanol/water mixture following which the cotyledons were flaked and subjected to a solvent extraction process employing hexane and finally the product was ground to a fine mesh to produce the product employed in this example. This mixture of animal meat, animal fat and soy protein concentrate was blended, placed in a beaker and cooked in a water-bath to an internal temperature of 155°F. The amount of liquid which separated out from the entire mixture as a distinct layer was drained off and weighed and called exudate. Two similar systems were used with commercially available soy protein concentrates (samples B and C).

| Sample | Weight percentage separated material |
|--------|--------------------------------------|
| A      | None                                 |
| B      | 9.3                                  |
| C      | 10.0                                 |

The same soy protein concentrates were employed in an oil and water system comprising the following:

| Hydrogenated Vegetable Fat | 300 parts by weight |
| Salt                       | 20 parts by weight  |
| Water                      | 513 parts by weight |
| Soy Protein Concentrate    | 221 parts by weight |

This material, after mixing, was canned and treated to sterilizing temperatures of 250°F for 45 minutes. After cooling the cans to room temperature, the texture, color, aroma, firmness and uniformity of the emulsion were observed. Sample A was found better than the other two samples in all respects.

Cores of identical dimensions were cut from each of the foregoing emulsions and subjected to the action of a gel tester which comprises a piston being moved downward onto the top of the core at a constant rate of speed to produce a compression force on the core in terms of grams that continually increase in value until the core collapses. If the collapsed core returns to its original shape the test is repeated until at least three runs have been made or until the core irreversibly splits. The results of this test in grams depression are as follows:

| Sample | Runs | | |
|--------|------|------|------|
|        | First | Second | Third |
| A      | 520  | 500  | 512  |
| B      | 480  | 224  | Split |
| C      | 508  | 500  | Split |

These data indicate a considerably better resiliency in Sample A than in either of the other two samples.

EXAMPLE 4

Four hundred grams of one variety of soybeans were soaked in ethanol-water (E/W) mixtures (1:1 v/v) at room temperature. No shaking was used and the beans-to-liquid ratio used was 1:8 (gms beans: ml liquid). At the end of 24 hours, the liquid was drained, fresh E/W added and the soaked beans were dehulled, while being submerged in liquid. The dehulled cotyledons were ground in the presence of E/W in a Waring blender and freeze-dried.

The yield of this final full-fat product was 74.5% (the remaining 25.5% included approximately 8% hulls and 17% leached out solids, a large proportion of which is carbohydrate and a small proportion is minerals and protein).

The analytical data of this product are:

| | |
|---|---|
| Protein (PDI=43.4%) | 48.0% |
| Fat | 23.7% |
| Moisture | 2.4% |

The above protein content on a moisture-free and fat-free basis is 64.9%. The product also exhibited a flatulence of 34.0%, compared to 100% for dehulled and hexane defatted soy meal. PDI is an abbreviation for protein dispersibility index which is a well-known term in the protein industry describing the fraction of total protein which can be dispersed in water at its inherent pH.

EXAMPLE 5

150 grams each of two varieties of soybeans (one of which is the same as that employed in Example 4) were soaked in ethanol/water (E/W) mixtures as follows:

First 24 hours at room temperature with 900 ml. (each) of 1:1, E/W mixtures, with slow agitation of the vessel.

Then the liquids from each batch were separated from the beans by draining, and fresh 900 ml. of 1:2 mixtures were added and further soaked for 24 more hours at room temperature using faster shaking (at least twice as fast).

Then the liquids were separated by draining, fresh 600 ml. of 1:2 mixtures added to each batch, manually shaken for about 5 minutes, and the beans dehulled, keeping the beans submerged under the liquid all the time. At the end of the dehulling the liquids were separated by draining, fresh 1:3 mixtures were added to the dehulled beans and these batches were ground in the liquid and then freeze-dried as in Example 1.

The percent yields and the pertinent analytical data were:

| Full-fat Material from Beans Variety | Yield % | Fat % | Protein % as is | Moisture % | Protein* % | PDI % | Flatulence** % |
|---|---|---|---|---|---|---|---|
| Variety of Example 4 | 70.6 | 25.6 | 51.9 | 4.9 | 74.6 | 29.9 | 4.1 |
| A second Variety | 70.0 | 26.9 | 50.9 | 5.1 | 74.9 | 46.3 | 5.6 |

*on moisture-free and fat-free basis
**Based on 100% for dehulled and hexane-defatted soy meal.

EXAMPLE 6

Twelve hundred grams of soybeans were soaked for 48 hours at room temperature. The beans-to-liquids (ethanol/water 1:1) ratio used was 1:8. Fresh soaking liquids in same ratio after draining old liquids were used for 24 hours. Mechanical shaking was used throughout the soaking period.

At the end of soaking period, the liquids were separated and difficult-to-soak beans (about 0.2–0.5% which were readily apparent) were screened out. The soaked beans were spread and dried for about 15 minutes (at room temperature) and then machine-dehulled. The dehulled beans were then partially dried (90°–100°F) and flaked.

The dried full-fat flakes were then hexane-extracted (50°C), desolventized and finely ground. The final defatted material contained 70.4% protein (moisture-free basis) with 44% PDI.

EXAMPLE 7

Twelve hundred grams of soybeans were soaked at room temperature for 72 hours. The ethanol-water mixtures for soaking were changed every 24 hours, the details of which are:

| | Ethanol | Water | E/W Ratio |
|---|---|---|---|
| First 24 hours | 4800 ml | 4800 ml | 1:1 |
| Second 24 hours | 3200 ml | 6400 ml | 1:2 |
| Third 24 hours | 2400 ml | 7200 ml | 1:3 |

Mechanical shaking of the beans was used throughout the soaking period. Then the beans were processed in the same manner as described in Example 6. The final defatted material contained 76.3% protein (moisture-free basis) with 65% PDI.

EXAMPLE 8

Five hundred grams of dehulled, split (half) soybeans (no moisture or heat was used during the dehulling) were soaked for 48 hours in ethanol-water mixture. The conditions of soaking and further processing were the same as those described in Example No. 4, except that in this particular case, the dehulling operation after soaking was not necessary.

The yield of full-fat material (51.3% protein and 24.7% fat on a moisture-free basis) was 78% and the final defatted material contained 75.4% protein (moisture-free basis) with 55% PDI. Both the full-fat and defatted materials were found to be at least as bland in flavor as the corresponding materials produced by soaking the whole soybeans.

When dehulled cracked soybeans were subjected to the same process substantially the same results as above were obtained whether the soaking medium was ethanol-water or methanol-water.

EXAMPLE 9

The process of Example 8 was repeated employing dehulled cracked soybeans and using isopropanol in place of ethanol. The full-fat product recovered from the process was judged to be more bland and lighter in color than the product of Example 8. The other properties of the product were substantially the same.

EXAMPLE 10

The process of Example 4 was repeated with the modification that a second period of soaking of 24 hours was added to the end of the first period and employing fresh E/W for the second period. This process was employed to treat whole soybeans, and dehulled cracked soybeans. The process was repeatedly employing isopropanol/water in place of ethanol/water. In each instance after the full period of 48 hours soaking with alcohol/water the beans were removed from the alcohol/water mixture and were soaked in water for one hour. The soaking liquid was drained off and replaced by fresh water and the soaking continued for another hour. This water soaking cycle was repeated to produce three cycles totalling three hours of time. The final soaking liquid was removed and the soaked beans were freeze-dried to about 3–5% moisture. These products were compared to products produced by the same process but not including the final three water soaking steps, and were judged to be more bland, more porous as evidenced by a bulk density of approximately ½ of the control material, softer in texture, and lighter in color. Other properties were substantially the same.

Although the invention has been described in considerable detail with reference to certain preferred embodiments it will be understood that variations and modifications can be effected within the spirit and scope of the invention as described above and as defined in the following claims.

What is claimed:

1. The process of producing a soybean material having the combined properties of bland flavor, high protein content with high protein dispersibility index, high fat content, and low flatulence, comprising soaking a full-fat soybean material in a liquid mixture of at least one aliphatic alcohol of 1–4 carbon atoms and water in a volume ratio of not more than 2:1 alcohol:water at a temperature of 0°–70°C and for a time at least sufficient for said liquid mixture to penetrate all of the soybean material, separating the soaking liquid from the soybean material, and recovering a soybean material containing substantially all of the fat in the original untreated soybean material.

2. The process of claim 1 wherein the soybean material is a soybean which is dehulled prior to soaking.

3. The process of claim 1 wherein the soybean material is a whole soybean which is dehulled subsequent to soaking.

4. The process of claim 1 wherein the soybean material is a full-fat dehulled cracked soybean.

5. The process of claim 1 wherein the soaking process is carried on in a plurality of steps.

6. The process of claim 5 wherein the later steps in the process involve increasingly higher water to alcohol proportions.

7. The process of claim 6 wherein the final step or steps in the process involve soaking in water containing no alcohol.

8. The process of claim 1 wherein the soaking is continued for a time equivalent to 2–4 times the length of time necessary to penetrate the entire bean.

9. The process of claim 1 wherein the full-fat product is subsequently defatted to any desired degree.

10. The process of claim 1 wherein the liquid is a mixture of water with at least one alcohol selected from the group consisting of methanol, ethanol and isopropanol.

11. As a new composition of matter a whole full-fat soybean which is free from enzymes capable of producing off-flavors and which exhibits a protein dispersibility index of at least 50% and has at least 48% protein, 23.7% oil, a bland flavor, and not more than 34% of the flatulence of the original untreated soybean material.

* * * * *